United States Patent [19]
Kaufman

[11] Patent Number: 6,133,362
[45] Date of Patent: Oct. 17, 2000

[54] CHEMICAL AID FOR USE OF SCRAP PLASTICS IN RUBBER FORMULATIONS

[75] Inventor: Harvey Lewis Kaufman, Hudson, Ohio

[73] Assignee: Polymer Process Technologies, Inc, Stow, Ohio

[21] Appl. No.: 09/184,455

[22] Filed: Nov. 2, 1998

[51] Int. Cl.$^7$ ................................................. C08J 11/00
[52] U.S. Cl. ......................... 524/450; 523/124; 524/47; 524/322
[58] Field of Search .................. 523/124–128; 524/450, 47, 322

[56] References Cited

U.S. PATENT DOCUMENTS

| | | | |
|---|---|---|---|
| 3,036,980 | 5/1962 | Dunham et al. | 260/31.4 |
| 4,348,492 | 9/1982 | Shasha et al. | 524/52 |
| 4,968,728 | 11/1990 | Wason | 523/216 |
| 4,983,651 | 1/1991 | Griffin | 524/47 |
| 5,303,661 | 4/1994 | Yu et al. | 110/341 |
| 5,597,851 | 1/1997 | Romine et al. | 521/41 |
| 5,650,454 | 7/1997 | Hoover et al. | 524/47 |
| 5,710,200 | 1/1998 | Toratani et al. | 524/191 |
| 5,731,358 | 3/1998 | Pillai | 521/41 |

*Primary Examiner*—James J. Seidleck
*Assistant Examiner*—U. K Rajguru
*Attorney, Agent, or Firm*—Emerson & Associates; Roger D. Emerson; Daniel A. Thomson

[57] ABSTRACT

An organo-metallic compound for use as a chemical aid in using scrap plastics in rubber formulations. The organo-metallic compound includes a zeolite, a starch, and a high molecular weight fatty acid soap. The compounds are in powder form and mixed together by a high-speed blender. The inventive compound creates a bridge between the scrap plastic and the rubber formulation allowing a blend between the two compounds. The compound accomplishes this while using a non-toxic substance. A method for using scrap plastics in rubber formulations is also provided. The method includes the step of adding the inventive compound to the scrap plastic and the virgin rubber.

15 Claims, No Drawings

CHEMICAL AID FOR USE OF SCRAP PLASTICS IN RUBBER FORMULATIONS

BACKGROUND OF THE INVENTION

I. Field of the Invention

This invention pertains to the art of rubber additives, and more particularly, to a chemical aid for using scrap plastics in rubber formulations.

II. Description of the Related Art

It has long been desired to find a way to dispose of scrap plastics. One known process is described in U.S. Pat. No. 4,983.651 to Griffin. Griffin discloses a degradable polymer composition which comprises a blend of a normally stable chemically saturated polymer, a less stable chemically unsaturated polymer, and a latent pro-oxidant. The molecular fragments created by the onset of oxidative scission of the molecule chains of the chemically saturated polymer is accelerated by the presence of filler particles. The Griffin compound is "self-destructing", or in other words biodegradable. The Griffin compound is intended to find a way to dispose of scrap plastics, not use them in the production of rubber compounds.

Other known uses of scrap plastics in rubber use other polymers that are more expensive than the current invention, and have a less effective yield. The other known uses of scrap plastics require the use of a very expensive polymer that does not have the bridging effect of the present invention. The polymer used, SBS, does not have the bridging effect between the scrap plastic and rubber, like the current invention.

The present invention contemplates a new and improved chemical aid for using scrap plastics in rubber formulations. Thus, this invention is simple in design, effective in use, and overcomes the foregoing difficulties and others while providing better and more advantageous overall results.

SUMMARY OF THE INVENTION

In accordance with one aspect of the current invention a new and improved composition for use of scrap plastics in rubber formulaitions includes a zeolite, a starch, and a high molecular weight fatty acid soap. The three compounds are mixed together to form the present invention.

In accordance with another aspect of the current invention the composition consists of 62–72% by weight of zeolite, 18–28% by weight of starch, and 5–15% by weight of high molecular fatty acid soap.

In accordance with yet another aspect of the current invention the composition consists of a zeolite, more particularly a magnesium-alumino silicate, a starch, more particularly cornstarch, and a high molecular weight fatty acid soap, more particularly calcium stearate.

One advantage of the present invention is that the inventive compound is less expensive than other rubber additives known in the art.

Another advantage of the current invention is the increased "inkability" of rubber stamp compounds.

Yet another advantage of the current invention is the compound's ability to act as a bridge between the scrap plastic and the virgin rubber, allowing for a higher percentage of the scrap plastic to be used.

Still another advantage of the current invention is that the compound is a simple mechanical blend that is consistent in its production.

A further advantage of the current invention is that the components of the inventive compound are non-toxic.

Still other benefits and advantages of the invention will become apparent to those skilled in the art upon a reading and understanding of the following detailed specification.

DESCRIPTION OF THE PREFERRED EMBODIMENT

It has been found by the test results that the new organometallic additive operates as a bridging agent for scrap plastic and rubber recipes. One of the problems that is solved by the present invention is that scrap plastic and virgin rubber do not mix. The inventive compound acts as the bridging agent between the plastic and the rubber, allowing the two to bond and create the new rubber compound. The inventive compound acts to create compatibility between the scrap plastic and the virgin rubber. The preferred scrap plastic employed in varying amounts is polyethylene sheeting.

EXAMPLE 1

Composition

In the preferred embodiment, the composition of the inventive compound is 67% by weight of the zeolite, 23% by weight of the cornstarch and 10% by weight of the calcium stearate. The inventive compound allows for ranges of the zeolite from between 62–72%, and between 18–28% for the starch, and between 5–15% for the fatty acid soap. The preferred zeolite is a magnesium-alumino silicate; however, any anionic zeolite, including sodium magnesium alumino silicate, calcium alumino silicate, and calcium magnesium alumino silicate, can be used. The preferred starch is cornstarch, but could be any starch known in the art. Cornstarch was chosen because it is relatively inexpensive. The preferred high molecular weight fatty acid soap is calcium stearate; again, chosen because it is relatively inexpensive.

TABLE 1

| SAMPLE CODE | INVENTIVE COMPOUND | % PE SCRAP | SCORCH $T_S(2)$ | CURE $T_C(90)$ | SHORE A |
|---|---|---|---|---|---|
| A | 0 | 0 | 3.80 | 5.80 | 46.4 |
| B | 1.57 | 3.64 | 4.47 | 8.60 | 50.28 |
| C | 1.20 | 7.97 | 3.40 | 5.0 | 49.00 |
| D | 3.00 | 0 | 4.30 | 8.20 | 43.78 |
| E | 2.38 | 6.41 | 4.90 | 7.30 | 40.50 |
| F | 0 | 0 | 5.00 | 8.00 | 55 |
| G | 1.64 | 11.47 | 3.20 | 6.70 | 54.69 |

SAMPLE CODE KEY
A. Proprietary flexographics NR/SBR red compound.
B. Same as A. plus additive and PE scrap
C. Same as A. plus additive and PE scrap
D. Proprietary mechanical goods (NR/SBR) compound plus additive
E. Same as D. plus PE scrap
F. Proprietary flexographics blue compound (NR/SBR)
G. Proprietary flexographics blue compound same as F plus additive and PE scrap.
Where PE = Low Density, High Density Polyethylene

EXAMPLE 2

Preparation of Composition

The composition is made by a mixture of the following powders: a zeolite, a starch, and a high molecular weight fatty acid soap. The powders are placed in a Henshel blender and blended at 25,000 rpm for 5–10 minutes. The temperature in the blender rises to 130–140° F., which creates the reaction necessary to bond the components of the composition. The Compound is then added to the mixture of plastic and rubber. The inventive compound is a simple mechanical blend that uses friction of the mix to form the necessary chelative bonds. Thus, the new organo-metallic polymer chemical aid for using scrap plastic elastomers in rubber is consistent in its production and involves no dangerous chemicals. The new compound is an organo-metallic polymer, which is unusual in the art.

The starch acts to disperse the inventive Compound throughout the rubber and plastic. An equal dispersion of the plastic throughout the rubber helps to increase wear resistance, and hence the life of the rubber compound. Also, at a starch content of 23%, it is found that the inventive compound is biodegradable in both polyethylene and PET (polyethyleneterephthalate).

The zeolite acts a molecular sieve. The zeolite has large geometric spaces due to the structure of the zeolite. The rubber and plastic polymer chains fit inside the zeolite and so are easily bonded together. The zeolite holds the plastic and rubber together, therefore forming a stable new compound.

TABLE 2

SUMMARY OF INK ANALYSIS FOR FLEXOGRAPHICS COMPOUNDS

| SAMPLE CODE | % INK TAKE UP | % INK PUTDOWN |
|---|---|---|
| A | 0.51 | 0.50 |
| B | 1.54 | 1.48 |
| C | 0.75 | 0.74 |

EXAMPLE 3

Physical Properties

Trials to determine the effectiveness of the inventive compound as an additive to natural rubber/SBR compounds were completed. The effect on scorch time, cure time, and Shore A hardness are shown in TABLE 1. The scorch time is defined as the initiation for the rubber curing process to begin, and the cure time is defined as the end time designating the completion of the rubber curing process. Scorch and cure times are measured by an oscillating rheometer. The Shore A hardness is measured by a Shore durometer, which gives a reading between 0–100 (0 being the softest, 100 being the hardest).

With reference to TABLE 1, Sample A is a proprietary natural rubber/SBR red compound. Sample B is the same as Sample A with the addition of 3.64% polyethylene scrap by weight and 1.5% by weight of the inventive compound. Sample C is the same as Sample A with the addition of 7.97% by weight of the polyethylene scrap and 1.20% by weight of the inventive compound. Sample D is a proprietary natural rubber/SBR mechanical goods compound including 3% by weight of the inventive compound and no polyethylene scrap added. Sample E is the same as Sample D having 6.41% polyethylene scrap and 2.3% by weight of the inventive compound added. Sample F is a proprietary natural rubber/SBR blue compound. Sample G is the same as Sample F with 11.47% by weight of polyethylene scrap and 1.64% by weight of the inventive compound added.

With reference to TABLE 1, it is shown that there is no statistically significant change in scorch time, cure time, or Shore A hardness in comparable compositions.

TABLE 3

PROPRIETARY NATURAL RUBBER/SBR RECIPE

| SAMPLE | % Invent Cmpd | % plastic pwdr | % rubber pwdr | Ts(2) | Tc(90) | Shore A |
|---|---|---|---|---|---|---|
| Control | 0 | 0 | 0 | 3.8 | 5.8 | 46 |
| 1 | 1.25 | 7.97 PE | 0 | 3.4 | 5.0 | 49 |
| 2 | 1.25 | 11.57 PE | 0 | 3.2 | 6.7 | 54 |
| 3 | 1.25 | 24 PE | 0 | 3.9 | 6.1 | 50 |
| 4 | 1.25 | 24.5 PVC | 0 | 4.0 | 6.6 | 53 |
| 5 | 1.25 | 1.21 PE | 6 | 3.1 | 6.3 | 50 |

PPE = Polyethylene
PVC = Polyvinylchloride

EXAMPLE 4

Inkability

This new compound has also increased the "inkability" of the rubber compounds. Increased "inkability" means that the compound will pick up ink and other polar materials with greater efficiency. TABLE 2 shows a summary of ink analysis for the natural rubber/SBR compound. Sample A is at control compound with no inventive compound or polyethylene scrap added. Sample B is the same as Sample A with 3.64% polyethylene scrap and 1.57% of the inventive compound added. A comparison of Sample B to Sample A shows a three-fold increase in inkability of the compound. Sample C is the same as A with 7.97% polyethylene scrap and 1.20% of the inventive compound added. Improved inkability is also shown in Sample C. The PE (polyethylene) and NR (natural rubber)/SBR mixed with the inventive compound increases the polarity of the plastic and rubber surfice, creating the enhanced "inkability." Using polyethylene scrap makes the new polymer product less expensive and easier to process. The scrap plastic can be of any of the group polyethylene, polypropylene, polyvinylchloride, PET (polyethyleneterephthalate), and any other related plastics. In increasing the "inkability" of rubber compounds, the inventive composition increases the polarity of the plastic or rubber surface, which enables it to pick up ink or other polar materials. The inventive compound creates compatibility between the plastic and the rubber, while using a non-toxic substance.

EXAMPLE 5

TABLE 3 shows a proprietary natural rubber/SBR recipe combined with plastic scrap and the inventive compound. The control and sample 1 in TABLE 3 are identical to sample A and sample C, respectively, in TABLE 1. In TABLE 3, sample 2 has 11.57% by weight polyethylene scrap and 1.25% by weight of the inventive compound added. Sample 3 has 24% by weight of the polyethylene scrap and 1.25% of the inventive compound added. Sample 4 has 24.5% by weight of polyvinylchloride scrap and 1.25% of the inventive compound added. Sample 5 has 1.21% by weight of polyethylene scrap, 6% by weight of rubber powder scrap, and 1.25% by weight of the inventive compound added.

Scorch time, cure time, and Shore A hardness comparisons are shown in TABLE 3. Again, it is shown that scrap plastic may be incorporated into various rubber compounds along with the inventive compound without adverse effects on scorch time, cure time, and Shore A hardness.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A method for using scrap plastics in formulating rubber compounds, the method comprising the steps of:
   a) providing a predetermined amount of a rubber selected from the group consisting of natural rubbers, synthetic rubbers, and mixtures of any of the foregoing;
   b) providing a predetermined amount of scrap plastic;
   c) providing an organo-metallic composition comprising a zeolite, a starch, and a high molecular-weight fatty acid soap; and,
   d) adding a predetermined amount of the organo-metallic composition to a mixture of the rubber and the scrap plastic.

2. The method of claim 1 wherein the scrap plastic is 0–24.5% by weight.

3. The method of claim 2 wherein the scrap plastic is polyethylene, the polyethylene being 0–24% by weight.

4. The method of claim 2 wherein the scrap plastic is polyvinylchloride, the polyvinylchloride being 24.5% by weight.

5. The method of claim 1, wherein the zeolite is a magnesium-alumino silicate.

6. The method of claim 1, wherein the starch is cornstarch.

7. The method of claim 1, wherein the high molecular weight fatty acid soap is calcium stearate.

8. The method of claim 1, wherein the composition comprises:
   a) 62–72% by weight of the zeolite;
   b) 18–28% by weight of the starch; and,
   c) 5–15% by weight of the high molecular weight fatty acid soap.

9. The method of claim 5, wherein the composition comprises 67% by weight of the magnesium-alumino silicate.

10. The method of claim 6, wherein the composition comprises 23% by weight of the cornstarch.

11. The method of claim 7, wherein the composition comprises 10% by weight of the calcium stearate.

12. A rubber compound comprising:
   a) rubber selected from the group consisting of natural rubbers, synthetic rubbers, and mixtures of any of the foregoing;
   b) plastic selected from the group consisting of polyethylene, polypropylene, polyvinylchloride, PET, and any other related plastics;
   c) an organo-metallic composition comprising:
      1) a zeolite;
      2) a starch; and,
      3) a high molecular weight fatty acid soap.

13. The rubber compound of claim 12, wherein the zeolite is a magnesium-alumino silicate.

14. The rubber compound of claim 12, wherein the starch is cornstarch.

15. The rubber compound of claim 12, wherein the high molecular weight fatty acid soap is calcium stearate.

* * * * *